United States Patent
Meade et al.

[11] Patent Number: 5,308,273
[45] Date of Patent: May 3, 1994

[54] METHOD OF MAKING AN ELECTRIC LAMP WITH A HIGH TORQUE THREADED BASE

[76] Inventors: Steven L. Meade, 1870 Bahama Rd., Lexington, Ky. 40509; Joseph P. Gallant, 3049 Dale Hollow Dr., Lexington, Ky. 40515

[21] Appl. No.: 950,098

[22] Filed: Sep. 23, 1992

[51] Int. Cl.⁵ .................................................. H01J 9/34
[52] U.S. Cl. ........................................ 445/27; 313/318
[58] Field of Search .................... 445/27, 26; 313/318

[56] References Cited

U.S. PATENT DOCUMENTS 4,485,326 11/1984 Hellwig et al. ...................... 313/318
4,647,809 3/1987 Blaisdell et al. ................. 313/318 X Primary Examiner—Kenneth J. Ramsey

[57] ABSTRACT

A method of making an electric lamp with high torque threaded base having lamp envelope, threaded base, and light source is disclosed. The electric lamp with high torque threaded base may be formed by making a lamp envelope with a ring of depressions extending around the lamp opening. A threaded brass base may then be rolled into the depressions, locking the threaded base to the lamp envelope. High temperature melting of the glass is then unnecessary, and expensive, or messy glues are unnecessary.

2 Claims, 5 Drawing Sheets

METHOD OF MAKING AN ELECTRIC LAMP WITH A HIGH TORQUE THREADED BASE

TECHNICAL FIELD

The invention relates to electric lamps, and particularly to methods of making electric lamps with threaded bases. More particularly the invention is concerned with a method of making a thread base electric lamp with a torque resistant base.

BACKGROUND ART

A few years ago, tungsten halogen technology was adapted for use in standard lamps. The new tungsten halogen standard lamps have an inner capsule that contains the tungsten halogen process, and an outer envelope that guards against possible non-passive fracture of the inner capsule, and shields the user from the high surface temperature of the inner capsule. The inner capsule is then mounted on a frame inside the outer envelope, with the frame acting as one of the electrical connections for the inner capsule. Tungsten halogen lamps can produce a higher quality light, be more efficient, and have a longer life than ordinary filamented lamps.

During assembly, the frame and inner capsule are inserted in the outer envelope, and the base is screwed on. The threaded base pinches the exterior arms of the frame against the envelope neck to make electrical contact and hold the frame in place. To make good electrical contact, and to ensure the base is not unthreaded, the frame to base contact has been made by a sharp point, aimed in the threading direction. As the base threads over the frame, the frame points dig progressively deeper into the base. In final position, the frame points are well embedded in the base, ensuring electrical contact, and are pointed against the unthreading of the base to prevent removal of the base. Because of variations in the pointed ends, the lengths of the frame components, molded glass dimensions and similar causes, the frame ends do not always contact the base equally. The frame can then be twisted in the outer envelope, leaving the inner capsule misaligned. This is a cosmetic problem. The misalignment can also be a mechanical problem. The misaligned inner capsule can knock against the outer envelope during shipment and break. The life of the inner capsule may also be affected by the irregular heat flow around the adjacent outer envelope. There is then a need for a support frame that consistently centers the inner capsule in the outer envelope.

The double envelope, tungsten halogen lamps are assembled by hand threading the base to the lamp neck. The torque characteristic of lamps with pointed frame ends is not a linear force, but is an increasing and perhaps even an accelerating force. The high torque need to thread the base to its final position may lead to injuries from repeated high stress of the assemblers, fingers, hands or wrists. By reducing the diameter of the support frame wire, the wire may be made more flexible, but a more flexible wire allows greater sway in the assembled lamp. Greater flexibility in the support frame is also likely to result in a bent, or distorted support frame. There is then a need for a double envelope electric lamp with a low assembly torque support frame for the internal capsule that is unlikely to sway or be distorted.

Standard lamps have frequently been sealed by cementing or epoxying the threaded metal base to the outer glass envelope. Fluid or paste glues and cements are not easy to work with in an assembly line operation. Inadequate gluing may occur, allowing the base to open. While excessive gluing may leave the lamps cosmetically unacceptable. Glues and cements are also usually relatively expensive materials. There is then a need for a method of coupling the metal base to the outer envelope of a capsule lamp without glue or cement.

The small portions of the threaded base have also been peened into slots formed in the lamp envelope in the past. Peening requires the lamp be properly oriented, so the peenings properly hit the preformed envelope slots. Alignment takes time, and machinery to properly execute the test. Peening regularly results in broken product, where the peening strike is excessive. Alteratively, using less peening force, yields lamps with bases that can come loose. There is then a need for a lamp with a mechanically sealed envelope and base, that does not use glue or cement.

Hand assembly of lamps does not usually lead to strong mechanical couplings between bases and envelopes. On the other hand, a lamp envelope, being made of glass is usually fragile, and a mechanical coupling made by a machine can lead to fracture of the lamp envelope, and wasted product. There is then a need for a machine made mechanical coupling between the outer envelope of a capsule lamp and a threaded metal base.

Examples of the prior art are shown by the following U.S. patents.

U.S. Pat. No. 3,194,625 issued to G. K. Danko on Jul. 13, 1965 for an Electric Lamp with Unitary inner Envelope and Stem Assembly and Manufacturing thereof shows a threaded base lamp with an internal capsule integral with an outer envelope. The threaded base is cemented to the outer envelope.

U.S Pat. No. 3,243,634 issued to F. A. Mosby on Mar. 3, 1966 for an Electric Lamp and Support Web shows a threaded base lamp with an internal capsule supported from the threaded base. The threaded base is cemented to the outer envelope with an epoxy.

U.S. Pat. No. 4,647,809 issued to R. G. Blaisdell et al. Mar. 3, 1987 for Electric Lamp with Self Mounting Frame Assembly and Method of Constructing Same, shows a threaded base lamp with an internal capsule. The internal capsule is supported on a wire frame that was spiked ends bent around the opening of the outer envelope. The threaded base is threaded to the outer envelope causing the spiked ends to be compressed and pointed into the base. The spikes then resist unthreading of the base from the outer envelope.

U.S. Pat. No. 4,959,583 issued to Vito J. Arsens et al on Sep. 25, 1990 for a Reflective Lamps Having An Improved Light Source Mounting Arrangement shows a threaded base lamp with an internal capsule. The threaded base is coupled to the outer envelope a high temperature resistive adhesive.

DISCLOSURE OF THE INVENTION

An electric lamp with a high torque resistant base may be formed by forming a lamp envelope with a tubular end have a series of prominences defining intermediate concavities encircling the tubular end, forming a threaded base having an end ring with a diameter sufficient to allow the threaded base to cover the tubular end, and prominences of the lamp envelope, inserting a light source having at least two electric leads into the lamp envelope, mating the threaded base to the light source for electrical connection, coupling the threaded base to the lamp envelope by at least deforming the end ring to mesh portions of the end ring into the concavities, thereby forming the electric lamp with a high torque resistant base.

BEST MODE FOR CARRYING OUT THE INVENTION

Figure 1:
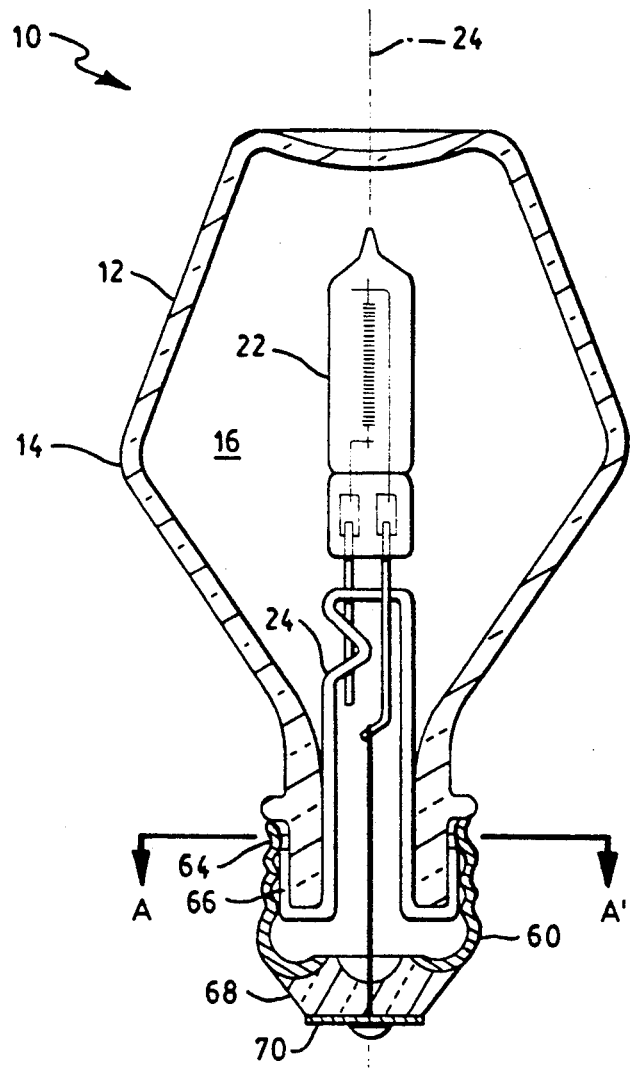
FIG. 1 shows a cross sectional view of a preferred embodiment of an electric lamp with threaded base.

FIG. 1 shows a preferred embodiment of an electric lamp 10 with high torque threaded base 60. The electric lamp 10 with high torque threaded base 60 may be assembled from a lamp envelope 12, a light source 22, and a threaded base 60.

Figure 2:
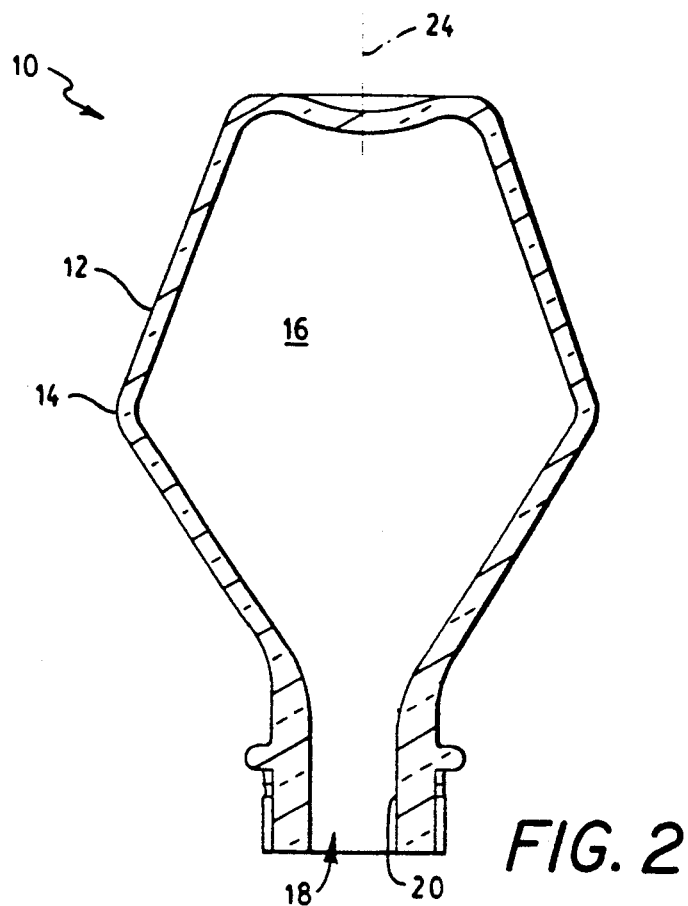
FIG. 2 shows a cross sectional view of a lamp envelope.
Figure 3:
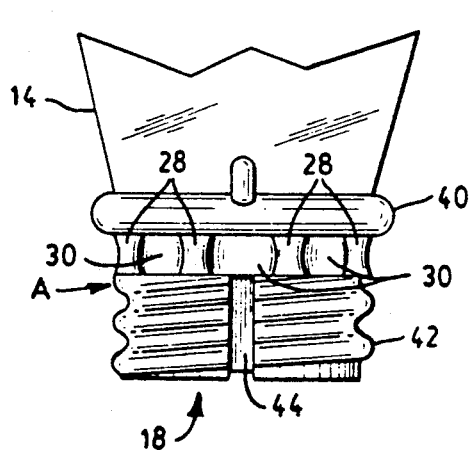
FIG. 3 shows a side prospective view of a lamp envelope, partially broken away.
Figure 5:
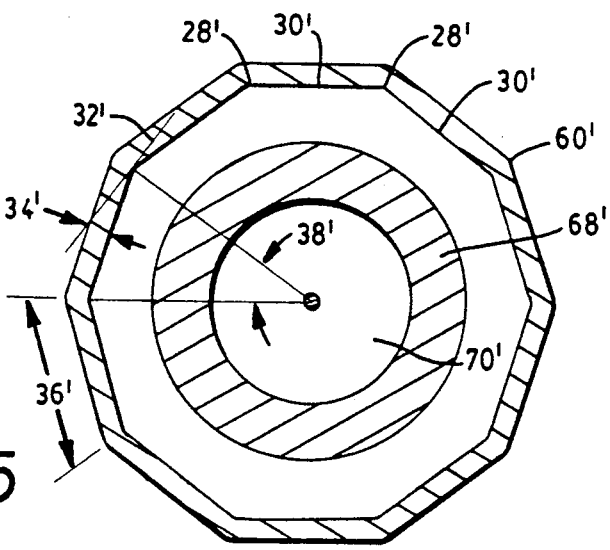
FIG. 5 shows an alternative cross sectional view of an electric lamp at A—A'.
Figure 6:
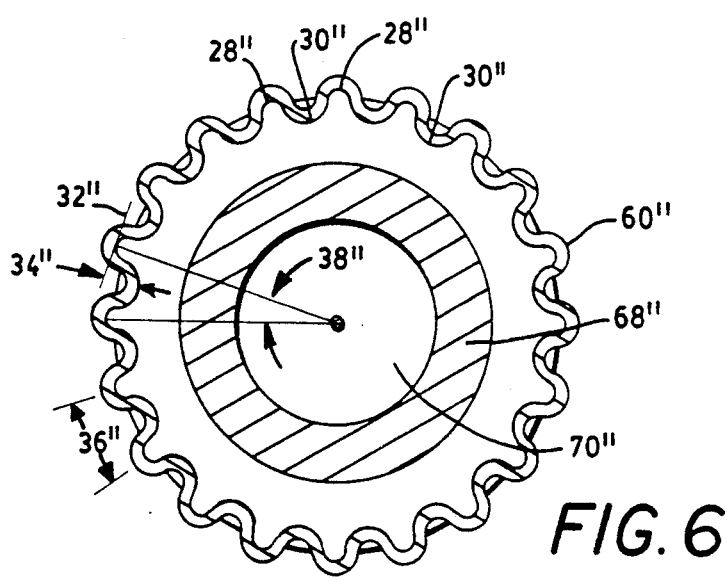
FIG. 6 shows an alternative cross sectional view of an electric lamp taken at A—A'.

FIG. 2 shows a cross sectional view of a lamp envelope. The lamp envelope 12 may be made out of quartz, glass or any other convenient light transmissive material. The preferred material is glass. The lamp envelope 12 has a wall 14 defining an enclosed volume 16 and an opening 18 at a generally tubular end 20. The preferred wall 14 defines a standard light bulb, or an A-line bulb. The enclosed volume 16 is sufficiently large to enclose a light source 22, such as a tungsten halogen light capsule, or an arc discharge capsule, and support frame 24. Formed as a portion of the lamp envelope 12, extending from the enclosed volume 16, and ending at an opening 18 is a tubular end 20 aligned along a lamp axis 24. The tubular end 20 may have a constant or variable diameter along the axial length. The tubular end 20 may also have a constant or variable diameter at any point along its axial length. The preferred tubular end 20 has circular cross section, and a constant or decreasing diameter as the opening 18 is approached from the enclosed volume 16. Circularly distributed around the tubular end 20 are a series of prominences 28 defining between respectively sequential prominences 28 a corresponding series of respective intermediate concavities 30. The prominences 28 and intermediate concavities 30 are then distributed around the tubular end 20, along an axial cross section of the tubular end 20. The preferred prominences 28 are a regularly spaced series of rounded peak bumps lying on a tangency circle 32 around the tubular end 20. The prominences 28 then define a series of intermediate concavities 30, concavity being with respect an enclosing tangency circle 30, along the same enclosing circle 30. Between two sequential prominences 28 is then a concavity 30, and adjacent on either side of a prominence 28 are two concavities 30. The concavities may be formed as flat planes 30' between the prominences 28' giving the cross section of the tubular end 20 something of a polygonal form. FIG. 5 shows an alternative cross sectional view of an electric lamp that may be taken at A—A' with flat faced indentations from the tangency circle 32'. Making the cavitations 30' flatter or less deep enhances the sealing contact between lamp envelope 12 and the threaded base 60, but is thought to reduce the resistance of the base to unthreading. The concavities may be indented further, as deep indentations 30'', so the tubular end 20'' then has geared, or splined form. FIG. 6 shows an alternative cross sectional view of an electric lamp that also may be taken at A—A' with deep sinusoidal indentations forming a gear like pattern. Increasing the depth of the cavitations 30'' is thought to increase the resistance of the base 60 to unthreading, but reduces the seal between the lamp envelope 12 and threaded base 60. The concavities 30 should have sufficient trough to peak (tangency circle 32) depth 34, and width 36 to receive an indentation of an adjacent portion of the threaded base 60. An axial angle 38 of 15 or more degrees for each concavity 28 is felt to be functional. In the preferred embodiment, ten or twelve prominences 28 are formed around the tubular end 20, similarly forming ten or twelve intermediate concavities 30 with axial angles 42 of from 15 to 18 degrees each. The preferred concavities 30 have smooth concave faces. The preferred prominences 28 have a trough to peak dimension 34 that is preferably greater than the wall thickness 50 of the threaded base 60.

In the preferred embodiment, adjacent the ring of prominences 28 and concavities 30, on the side away from the opening 18 may be a circular rib 40. Adjacent the ring of prominences 28 and concavities 30 on the side towards the opening 18 may be an envelope threading 42 similar to a standard light socket threading. In the preferred embodiment, a trough 44 is molded in the tubular end 20 that extends from the opening 18, across the threading 42 towards the circular rib 40, and may end adjacent the circular rib 40. The lead trough 44 has a width and depth sufficient to receive a light source 22 lead, or support frame 24 leg to be trapped between the lamp envelope 12 and the lamp base 60, thereby making a secure electrical connection to the threaded base 60. By way of example lamp envelope 12 is shown as a standard A-line bulb with a tubular end 20. Formed on the tubular end 20 are ten rounded prominences 28 distributed equiangularly (36 degree) around the tubular end 20. Intermediate the prominences 28 are ten smooth surfaced concavities 30. The tubular end 20 is additionally molded with a standard envelope threading 42 and a cross cut lead trough 44. The lamp envelope 12 need not be molded with a threaded base 60. Only the threading on the exterior of the threaded base 60 is necessary. The lamp envelope 12 need not include a lead trough 44, as the light source lead may be soldered, pinched to or otherwise electrically coupled to the threaded base 60. The light source to threaded base 60 connection is a matter of the designers choice.

The light source 22 may have any convenient form with two exposed electric leads. The lamp envelope 12 encloses the light source 22 along with a frame support if a frame support is used. The threaded base 60 seals the light source 22 in the enclosed volume 16, and electrically connects to the lamp lead. By way of example, the light source 22 is shown as a single ended tungsten halogen capsule with a press sealed quartz tube, and two electric leads extending from the press seal. One lead is connected to the support frame 24 that is in turn connected to the threaded base 60 side wall contact. The other lead may be connected to the center contact 70. Other suitable light sources may be used, such as a double ended tube, a high intensity arc discharge source or a low intensity source.

Figure 7:
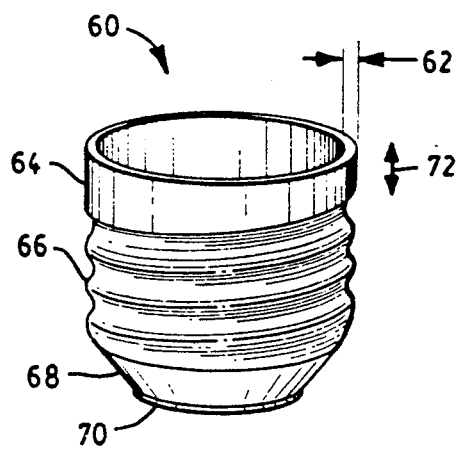
FIG. 7 shows a prospective view of a threaded base.
Figure 4:
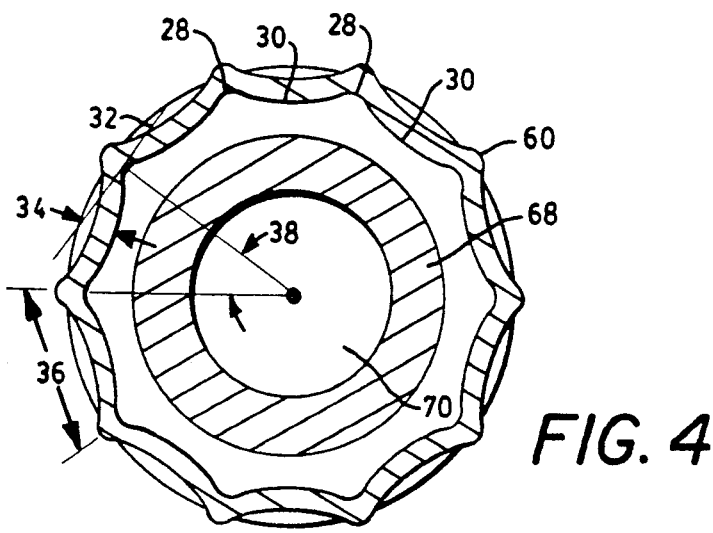
FIG. 4 shows a cross sectional view of an electric lamp taken at A—A'.

FIG. 7 shows a threaded base 60. The threaded base 60 may be made out of brass, aluminum or another malleable and conductive metal to have the general form of cup with a threaded side wall. The tubular end 20 of the lamp envelope 12 threads into the threaded base 60. The preferred threaded base 60 has a wall thickness 62, an end ring 64, a base threading 66 formed in a side wall, an insulating ring 68, and a center contact 70. The end ring 64 of the threaded base 60 has a top edge with an axial extension 72 sufficient to span at least a portion of the ring of prominences 28 and concavities 30 when the lamp envelope 12 is properly positioned or threaded into the threaded base 60 as the case may be. The preferred threaded base 60 also has an internal diameter sufficient to threadingly mate with the tubular end 20 of the lamp envelope 12 threading 42 while entrapping a light source lead, or support frame 24 leg in the lead trough 44. The preferred end ring 64 is a right circular tube, having an internal diameter the same as the diameter of the tangency circle 32 for the ring of peaks of the prominences 28, and having an axial width equal or greater than the axial width of the ring of prominences 28 and concavities 30. The end ring 64 then closely fits to, and covers the ring of prominences 28 and concavities 30. Positioned along at least the exterior side wall of the threaded base 60 is a base threading 66 sized to fit a lamp socket. In the preferred threaded base 60, positioned at the end of the threaded base 60 around the axis 26 is an insulator ring 68, and positioned at the end of the threaded base 60 at the axis 24 is a center contact 70. The insulator ring 68 may be a glass insulator ring 68, and the center contact 70 may be a metal eyelet. The insulator ring 68 and center contact 70 then form the standard center contact, typical of common light bulbs.

An electric lamp 10 with a threaded base may be assembled by performing the following steps. First a glass lamp envelope 12 is molded having the above mentioned envelope features. Similarly, a threaded base 60, such as a brass base is made, also with the above mentioned base features. In the preferred procedure, the legs of the support frame 24 are bent to form hooks, and one lead of the light source 22 is then welded to the support frame 24. The light source 22 and support frame 24 unit is then inserted in the lamp envelope 12, with the hooked support frame legs positioned in the lead troughs 44. The second lead then extends axially out of the enclosed volume 16, through opening 18. The threaded base 60 is then threaded over the second lead, so the second lead passes through the eyelet forming the center contact 70. The threaded base 60 is then threaded over the lamp envelope threading 42, trapping the support frame 24 legs in the lead troughs 44 in contact with the threaded base 60 side wall. The threaded base 60 is threaded forward until the end ring 64 is aligned to cover the ring of prominences 28 and concavities 30 of the lamp envelope 12. Threading the base onto the lamp envelope 12 may cause the inside portions of the base threads 66 to press progressively harder against the support frame 24 legs in the lead trough 44, thereby forming a hard pinched contact between the threaded base 60 and the trapped support frame legs. The second lead is then soldered to the eyelet forming the center contact 70, and any excess lead is trimmed appropriately, if needed.

Figure 8:
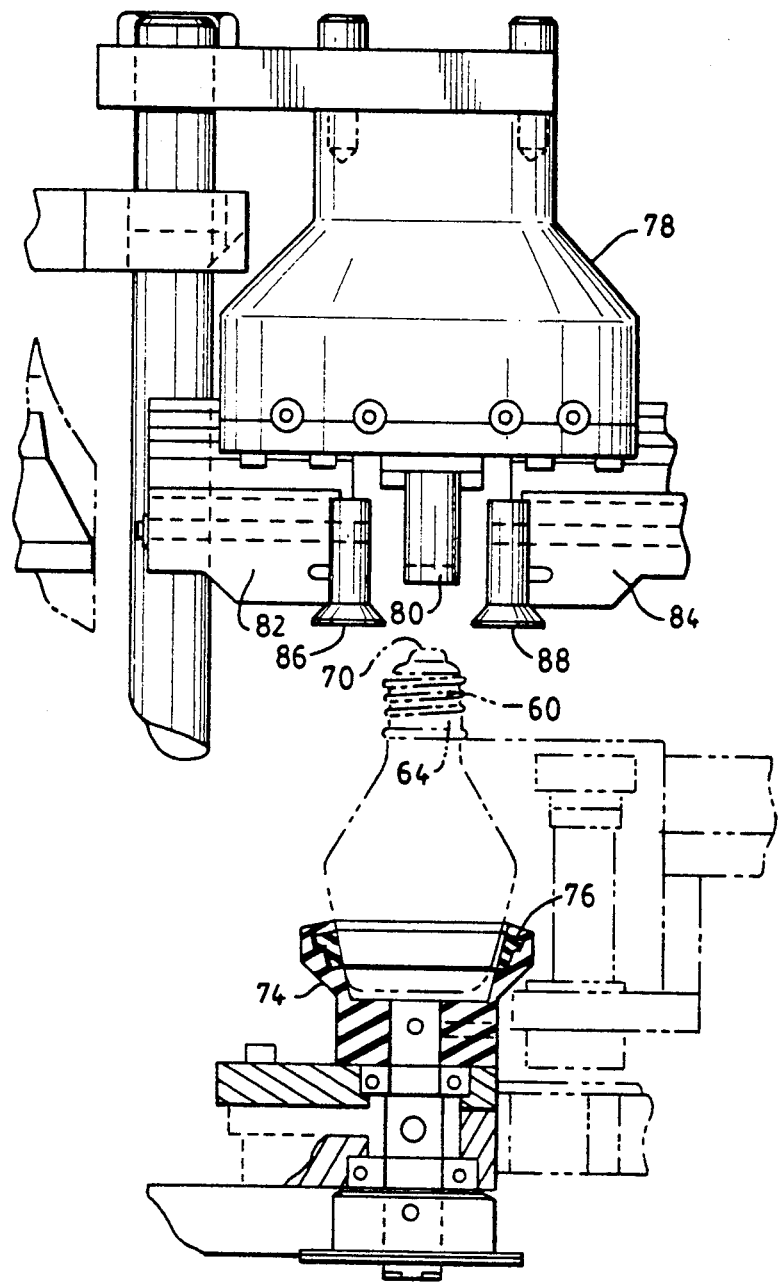
FIG. 8 shows a partially broken away and partially phantom view of equipment for roller sealing an electric lamp (lamp in phantom) prior to the sealing operation.

The lamp envelope 12 with the threaded base 60 base in position may be then held coaxially in a rotatable cup 74. FIG. 8 shows a partially broken away and partially phantom view of equipment for roller sealing an electric lamp prior to the sealing operation. The lamp is show in phantom held in cup 74. The preferred cup 74 includes a rubber grip 76 to frictionally grasp the lamp envelope 12. A roller sealing assembly is then advanced until a rotating contact 80 meets the center contact 70 (bottom) of the threaded base 12.

Figure 9:
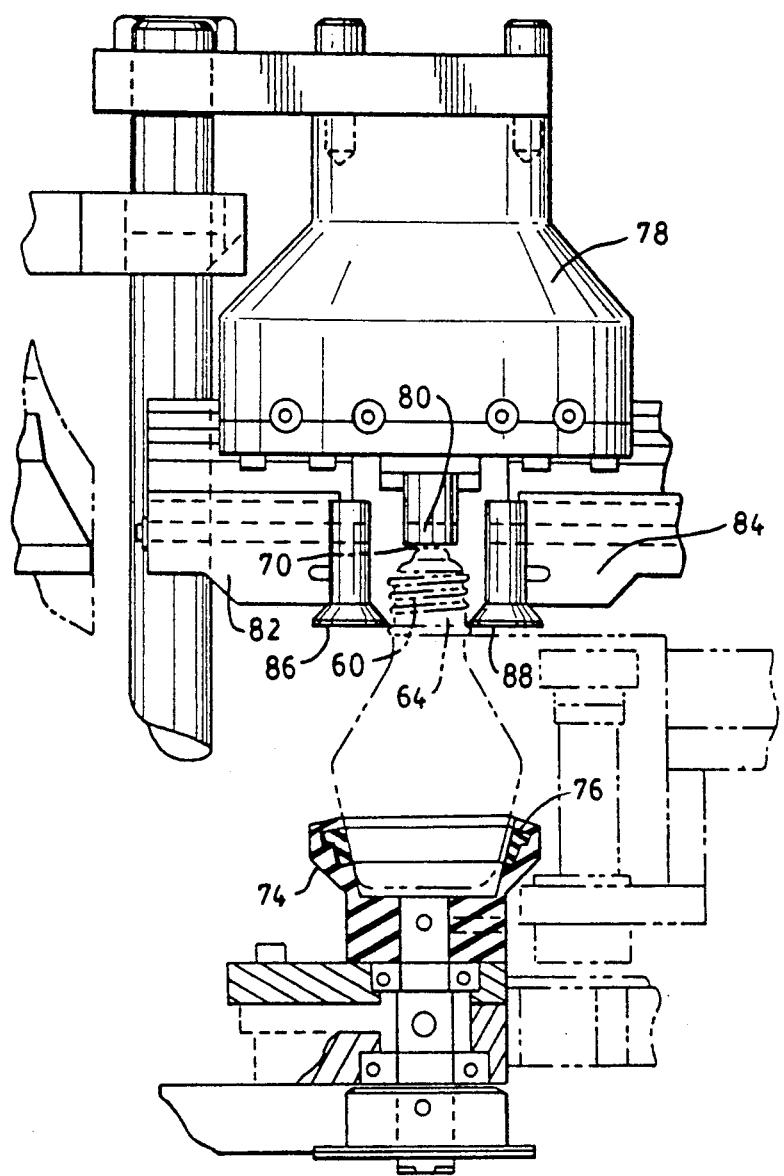
FIG. 9 shows a partially broken away and partially phantom view of equipment for roller sealing an electric lamp (in phantom) during the sealing operation.

FIG. 9 shows a partially broken away and partially phantom view of equipment for roller sealing an electric lamp (in phantom) during the sealing operation. With the lamp envelope 12 and threaded base 60 rotating in the cup 74, swing arms 82, 84 are advanced to contact pressing wheels 86, 88 against the threaded base 60 along the end ring 64. The pressing wheels 86, 88 are aligned to contact diametric sides of the threaded base 60 and end ring 64 with sufficient pressure to press the end ring 64 against the lamp envelope 12 along the prominences 28, and down into the concavities 30. The lamp envelope 12 and threaded base 60 are then rolled while pressure from the pressing wheel 78 forces the end ring 64 against the prominences 28, and down into the concavities 30. Alteratively one or more press arms may be advanced against the threaded base adjacent the concavities 30 to push the threaded base end ring into the concavities 30. The end ring 64 is then trapped in the concavities 30, between the prominences 28 to resist unthreading of the threaded base 60 from the lamp envelope 12. Similarly the edge of the end ring 64 is bent over and trapped behind the circular rib 40, thereby sealing the threaded base 60 to the circular rib 40. The threaded base 60 is then sealed to the lamp envelope 12, and has high resistance to unthreading of the threaded base 60 from the lamp envelope 12. Epoxy need not be used in lamp envelope 12 to threaded base 60 coupling. Tests have been performed that indicate the roller sealed threaded base 60 is not easily, or cannot be unthreaded from the lamp envelope 12 with ordinary human strength.

In a working example some of the dimensions were approximately as follows: The lamp envelope was made of glass, and had a wall, an enclosed volume, a tubular end, ten prominences and intermediate concavities formed as a ring. The lamp envelope had a tubular end with an outside diameter of 25.0 millimeters (0.985 inch) with a standard lamp socket threading extending 7.34 millimeters (0.289 inch) axially from the opening end. Adjacent the envelope threading was a circularly aligned series of ten round peaked prominences and ten intermediate, inwardly rounded, chordal concavities. The concavities were about 2.235 millimeters (0.088 inches) axially wide. Adjacent the ring of concavities was a semicircular envelope rib, about 3.2 millimeters (0.126 inch) axially wide. The lamp envelope had two leads troughs, diametrically positioned about 1.65 millimeter (0.065 inch) wide, 0.86 millimeters (0.034 inch) deep, and 7.34 millimeters (0.289 inch) axially long. The threaded base was made of brass, and had a tubular end with an end ring 27.0 millimeters in diameter (1.075 inch), an insulator ring 15.62 millimeters in diameter (0.615 inch), and an eyelet like center contact 10.0 millimeters in diameter (0.40 inch) threading, a center contact.

In a first working set of lamps, eleven heavy glass wall lamps were made using a pressing wheel with a diameter of 2.54 centimeters (1.0 inch) and a width of 1.905 millimeters (0.075 inch). In roller sealing the lamp envelopes and threaded bases, none of the lamps broke. Each of the lamps was then tested to measure the torque inch pounds needed to unthread the bases from the lamp envelopes. The average unthreading force was 61.36 torque inch pounds. A second set of five heavy glass wall lamps were made using a narrower pressing wheel, 1.524 millimeters (0.060 inch). The average unthreading force was increased to 66.25 torque inch pounds. In a fifty lamp test none of the lamps were broken, and all of the wire support frames were excellently positioned. Since the average person cannot unthread a lamp sealed at 50 torque inch pounds, the lamps were more than adequately sealed. The disclosed operating conditions, dimensions, configurations and embodiments are as examples only, and other suitable configurations and relations may be used to implement the invention.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A method of forming an electric lamp with a high torque resistant base comprising the steps of:
   a) forming a lamp envelope with a tubular end have a series of prominences defining intermediate concavities encircling the tubular end,
   b) forming a threaded base having an end ring with a diameter sufficient to allow the threaded base to cover the tubular end, and prominences of the lamp envelope,
   c) inserting a light source having at least two electric leads into the lamp envelope,
   d) mating the threaded base to the light source for electrical connection,
   e) coupling the threaded base to the lamp envelope by at least deforming the end ring to mesh portions of the end ring into the concavities, thereby forming an electric lamp with a high torque resistant base.

2. The method in claim 1, wherein mating is accomplished by rollers pressing portions of the threaded base into the concavities, while the lamp envelope and threaded base are rotated with respect to the rollers.

* * * * *